(12) United States Patent
Brunner et al.

(10) Patent No.: US 12,544,150 B2
(45) Date of Patent: Feb. 10, 2026

(54) FIELD GENERATOR ORIENTATION FOR MAGNETIC TRACKING IN PLANAR FIELD GENERATING ASSEMBLIES

(71) Applicant: Northern Digital Inc., Waterloo (CA)

(72) Inventors: Georg Brunner, Constance (DE); Krunoslav Prsa, Radolfzell (DE)

(73) Assignee: Northern Digital Inc., Waterloo (CA)

( * ) Notice: Subject to any disclaimer, the term of this patent is extended or adjusted under 35 U.S.C. 154(b) by 104 days.

(21) Appl. No.: 18/183,501

(22) Filed: Mar. 14, 2023

(65) Prior Publication Data
US 2023/0293245 A1  Sep. 21, 2023

Related U.S. Application Data

(60) Provisional application No. 63/321,434, filed on Mar. 18, 2022.

(51) Int. Cl.
| | | |
|---|---|---|
| *A61B 34/20* | (2016.01) | |
| *G01D 5/20* | (2006.01) | |
| *A61B 90/00* | (2016.01) | |

(52) U.S. Cl.
CPC .............. *A61B 34/20* (2016.02); *G01D 5/20* (2013.01); *A61B 2034/2051* (2016.02); *A61B 2090/067* (2016.02)

(58) Field of Classification Search
CPC ................. A61B 2034/2051; A61B 2090/067
See application file for complete search history.

(56) References Cited

U.S. PATENT DOCUMENTS

| | | | |
|---|---|---|---|
| 4,821,731 A * | 4/1989 | Martinelli | ........ A61B 2034/205 600/463 |
| 6,625,563 B2 | 9/2003 | Kirsch et al. | |
| 7,835,785 B2 | 11/2010 | Scully et al. | |
| 8,494,794 B2 | 7/2013 | Dutta et al. | |
| 8,644,551 B2 | 2/2014 | Hagbi et al. | |
| 8,764,709 B2 | 7/2014 | Chang et al. | |
| 8,942,780 B2 | 1/2015 | Scully et al. | |
| 9,204,820 B2 | 12/2015 | Clark et al. | |
| 9,477,307 B2 | 10/2016 | Chizeck et al. | |

(Continued)

FOREIGN PATENT DOCUMENTS

| | | |
|---|---|---|
| CN | 114577100 | 6/2022 |
| EP | 2532300 | 12/2012 |
| EP | 3505114 | 10/2020 |

*Primary Examiner* — Pascal M Bui Pho
*Assistant Examiner* — Gabriel Victor Popescu
(74) *Attorney, Agent, or Firm* — Fish & Richardson P.C.

(57) ABSTRACT

A magnetic tracking system includes a field generator assembly for generating a plurality of magnetic fields, wherein each magnetic field is generated by a respective magnetic field generator of the field generator assembly, at least one of the magnetic field generators having a first angular orientation and at least another of the magnetic field generator having a second angular orientation, different from the first angular orientation. The magnetic tracking system includes a magnetic sensor to measure the plurality of magnetic fields, and a computing device configured to compute a position and orientation of the magnetic sensor within the magnetic fields being measured by the sensor. The first angular orientation is between one and fifteen degrees and the second angular orientation is between one and fifteen degrees.

20 Claims, 8 Drawing Sheets

(56) References Cited

U.S. PATENT DOCUMENTS

| | | |
|---|---|---|
| 10,300,246 B2 | 5/2019 | Parmar et al. |
| 10,321,848 B2 | 6/2019 | Eichler et al. |
| 10,398,514 B2 | 9/2019 | Ryan et al. |
| 10,413,185 B1 | 9/2019 | Boveja et al. |
| 10,426,554 B2 | 10/2019 | Siewerdsen et al. |
| 10,499,793 B2 | 12/2019 | Ozerov et al. |
| 10,983,340 B2 | 4/2021 | Popovich et al. |
| 11,071,596 B2 | 7/2021 | Ryan et al. |
| 11,179,200 B2 | 11/2021 | Fahim et al. |
| 11,826,123 B2 | 11/2023 | Hill et al. |
| 2007/0078334 A1 | 4/2007 | Scully et al. |
| 2007/0265526 A1 | 11/2007 | Govari et al. |
| 2010/0198247 A1 | 8/2010 | Chang et al. |
| 2011/0082366 A1 | 4/2011 | Scully et al. |
| 2011/0129118 A1 | 6/2011 | Hagbi et al. |
| 2011/0224537 A1 | 9/2011 | Brunner |
| 2011/0251815 A1 | 10/2011 | Bar-Tal et al. |
| 2012/0071782 A1 | 3/2012 | Patil et al. |
| 2013/0072943 A1 | 3/2013 | Parmar et al. |
| 2013/0226024 A1 | 8/2013 | Gopinathan et al. |
| 2014/0049629 A1 | 2/2014 | Siewerdsen et al. |
| 2014/0320489 A1 | 10/2014 | Chizeck et al. |
| 2016/0287133 A1 | 10/2016 | Eichler et al. |
| 2017/0024014 A1 | 1/2017 | Chizeck et al. |
| 2017/0202627 A1* | 7/2017 | Sramek ............... A61B 34/20 |
| 2018/0168740 A1 | 6/2018 | Ryan et al. |
| 2018/0235437 A1 | 8/2018 | Ozerov et al. |
| 2019/0050999 A1 | 2/2019 | Piat et al. |
| 2019/0083115 A1 | 3/2019 | Bar-Tal |
| 2019/0183576 A1 | 6/2019 | Fahim et al. |
| 2020/0060547 A1 | 2/2020 | Hill et al. |
| 2020/0197107 A1* | 6/2020 | Ryan ..................... A61B 90/98 |
| 2023/0397958 A1* | 12/2023 | Wildeboer ....... A61B 2034/205 |

\* cited by examiner

FIELD GENERATOR ORIENTATION FOR MAGNETIC TRACKING IN PLANAR FIELD GENERATING ASSEMBLIES

CLAIM OF PRIORITY

This application claims priority under 35 USC § 119(e) to U.S. Patent Application Ser. No. 63/321,434, filed on Mar. 18, 2022, the entire contents of which are hereby incorporated by reference.

TECHNICAL FIELD

The disclosure relates to use of magnetic fields for determining an object's location and orientation.

BACKGROUND

Magnetic tracking systems use magnetic fields to determine the location and orientation of an object within a given region. A sensor is positioned on the object (e.g., a piece of equipment or a human body) to detect magnetic fields present within the given region. From the detected field information, a computer system may compute the location and orientation of the object with respect to a reference coordinate system. These systems are useful, for example, in the medical field, for tracking instruments associated with medical procedures thereby facilitating advanced methods in surgery and diagnostics.

SUMMARY

Different magnetic fields can be produced by orienting magnetic field generators at different angular orientations. Some resulting magnetic fields can be advantageous for tracking an object within a given region. For example, parallel magnetic fields close to a field generator assembly cause difficulties for determining the position and the orientation of a sensor. When magnetic fields are parallel, at close ranges fewer field generators contribute useful information about the position and the orientation of the sensor. Magnetic fields that are not parallel are advantageous because the sensor can determine unique measurements from each magnetic field, even at close distances. For example, using thin, flat field generators with different angular orientations leads to improved tracking.

In an aspect, a magnetic tracking system includes a field generator assembly for generating a plurality of magnetic fields, wherein each magnetic field is generated by a respective magnetic field generator of the field generator assembly, at least one of the magnetic field generators having a first angular orientation and at least another of the magnetic field generator having a second angular orientation, different from the first angular orientation. The first angular orientation is between one and fifteen degrees and the second angular orientation is between one and fifteen degrees. The magnetic tracking system also includes a magnetic sensor to measure the plurality of magnetic fields, and a computing device configured to compute a position and orientation of the magnetic sensor within the magnetic fields being measured by the sensor.

In some implementations, the magnetic field generator includes at least one of a wound electromagnetic coil, a quadratic electromagnetic coil, or a planar spiral.

In some implementations, the magnetic field generators are distributed on the field generator assembly such that at least two of the magnetic field generators are offset in position.

In some implementations, the computing device is configured to determine the first angular orientation and the second angular orientation.

In some implementations, the magnetic tracking system includes a conducting plate below the field generator assembly, and the conducting plate includes a permeable material.

In some implementations, the magnetic field generators have a same elevation angle and different azimuth angles.

In some implementations, the magnetic tracking system includes a third magnetic field generator having a third angular orientation, different from the first angular orientation and the second angular orientation.

In some implementations, the first angular orientation is in an opposite direction relative to the second angular orientation.

In some implementations, the first angular orientation is a first elevation angle, and the second angular orientation is a second elevation angle, the second elevation angle is different from the first elevation angle.

In an aspect, an apparatus includes a structural surface for supporting a portion of a patient during a medical procedure and a surface that includes a plurality of magnetic field generators of a field generator assembly for producing magnetic fields to form a measurement volume; wherein at least one magnetic field generator is at an angular orientation relative to the surface, and wherein the angular orientation of the at least one magnetic field generator is between one and fifteen degrees relative to the surface.

In some implementations, the apparatus includes a conducting plate below the surface.

In some implementations, at least two magnetic field generators are at different angular orientations relative to the surface.

In some implementations, at least two magnetic field generators are at different angular orientations relative to each other.

In some implementations, the at least two magnetic field generators are at angular orientations opposite each other.

In some implementations, the at least two magnetic field generators are at angular orientations between one and 15 degrees from the surface.

In some implementations, the at least two magnetic field generators are at angular orientations greater than 15 degrees from the surface.

In some implementations, the at least two magnetic field generators are at angular orientations pointed towards a center of the surface.

In some implementations, the at least two magnetic field generators are at angular orientations pointed away from a center of the surface.

In some implementations, the at least two magnetic field generators are at angular orientations with a same angle relative to the surface.

In some implementations, the at least two magnetic field generators are at angular orientations with a different angle relative to the surface.

In some implementations, the plurality of the magnetic field generators are distributed on the field generator assembly such that at least two of the magnetic field generators are offset in position.

The foregoing and other advantages and features herein will, in part, appear in the following detailed description and claims, taken together with the drawings.

DETAILED DESCRIPTION

Figure 1:
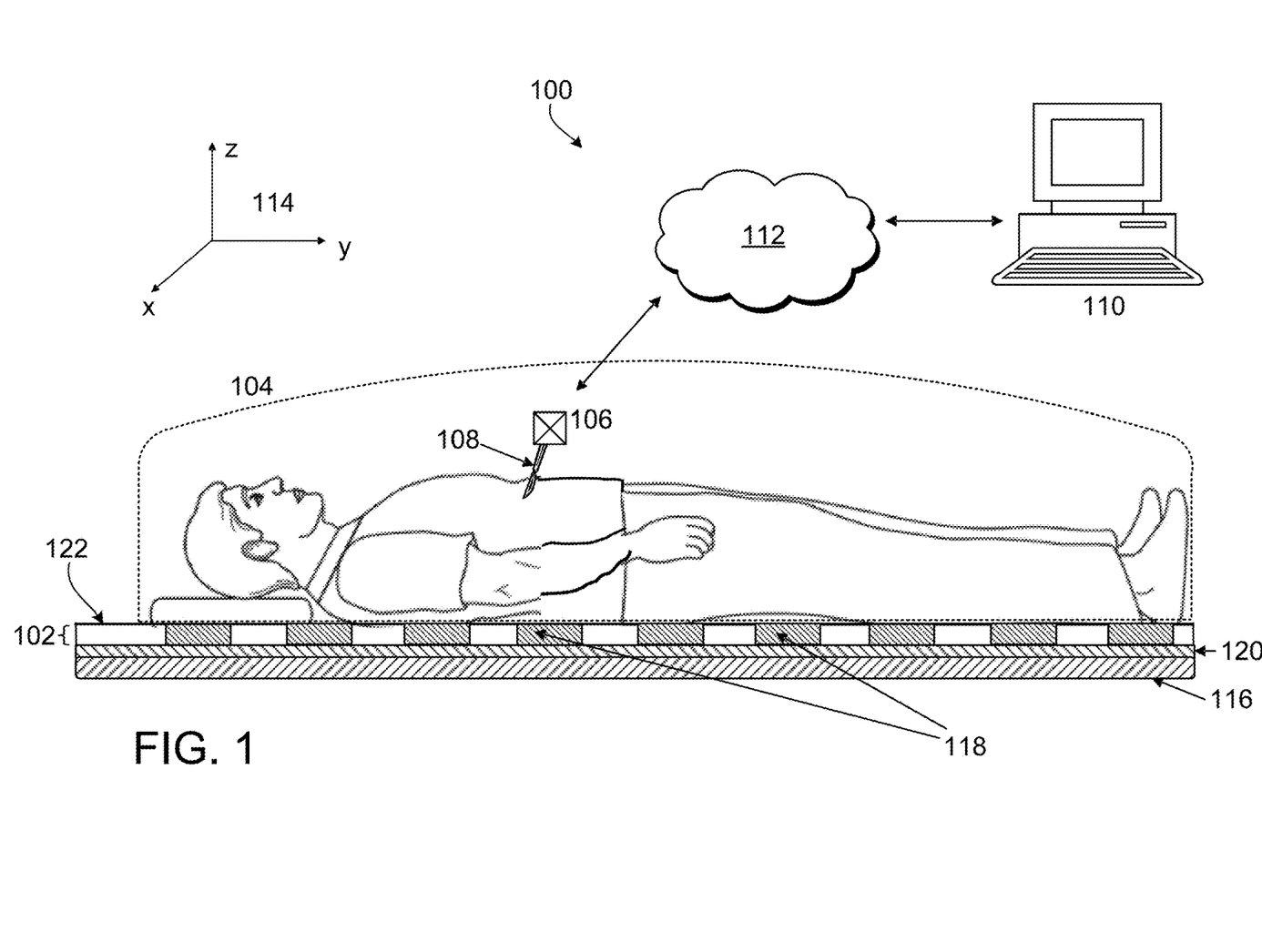
FIG. 1 is a schematic diagram of a magnetic tracking system.

Different magnetic fields can be produced by orienting magnetic field generators at different angular orientations. Some resulting magnetic fields can be advantageous for tracking an object within a given region. Referring to FIG. 1, a schematic diagram of a magnetic tracking system 100 is shown and described. In brief overview, the system 100 includes a magnetic field generating assembly 102 that is configured to generate magnetic fields within a given a three dimensional region e.g., a volume 104. A sensor assembly 106 placed on an object 108 (e.g., a scalpel) within the given volume 104 detects and/or measures the magnetic fields and communicates the measurements to a computing device 110, e.g., by way of a communications link 112 (e.g., wired or wireless connections). Based on the measurements by the sensor assembly 106, the computing device 110 can compute a position of the sensor assembly 106 (and therefore of the object 108) with respect to a coordinate system 114. Such position computation facilitates motion tracking of the sensor assembly 106 within the region 104. This is useful in advanced surgical procedures where the sensor assembly 106 can be mounted on objects such as a scalpel to track the motion of the objects as a medical procedure is being executed (e.g., track the movements of the scalpel with relation to a reference such as a second sensor assembly fixed to the body of a patient).

In some implementations, the field generating assembly 102 is relatively thin in dimensions (e.g., height) and can be mounted on a flat surface such as a surgical table 116. Such a field generating assembly may be referred to as a flat field generator. Even though FIG. 1 depicts the field generating assembly 102 as being mounted on the surgical table 116, in some implementations, the field generating assembly 102 may be integrated into the surgical table 116 by possibly embedding the field generating assembly 102 within the surgical table 116. In this particular arrangement, the field generating assembly 102 includes a plurality of field generators 118 (e.g., one or more field generators) that each may include one or more electromagnetic coils that produce a magnetic field (e.g., by passing current through each coil). For example, an electromagnetic coil can be formed by winding a conductor, such as an electrical wire, around a core of magnetic material or a non-magnetic material (e.g., air). When a current is passed through the windings of a coil, a magnetic field is produced that extends through the center of the coil along its longitudinal axis and circles back around the outside of the loop or coil. The magnetic field circling each loop or winding of wire combines with the fields from the other loops to produce a concentrated field down the center of the coil. The strength of a coil's magnetic field can be controlled by controlling the current, the number of loops or windings of the coil, and other parameters and characteristics associated with the coils.

Other parameters may be varied to control the shape of the induced fields. For example, level of current flowing through the individual generators, number of windings in the individual generators, physical dimensions of the generators, materials used to construct the generators, and other similar parameters used for shape control (also generator geometry). In some implementations, coils with adjustable taps can be used to control the number of windings of a field generator 118.

In some implementations, the presence of particular types of materials (e.g., conductive materials) in the vicinity of the induced magnetic fields may contribute to distorting or changing the shape of the fields. Even due to the presence of permeable materials, the shape of the fields may bend or change. In general, random presences of conductive and/or permeable objects generate parasitic eddy current fields, thereby distorting the shape of the induced fields. While a random presence of such conductive and/or permeable materials is usually not desirable, in some implementations, such objects may be used for controlling the shape of the induced magnetic fields. For example, a conductive plate 120 can be used to shield or shape the induced magnetic fields. In some implementations, multiple plates can be used. For example, multiple conductive plates can be used around the magnetic field, above the magnetic field, below the magnetic field, etc. In some implementations, all of the plates are conductive; however, this is not always the case. For example, only some plates may be conductive. In the illustrated example, it is not desirable to have the induced magnetic fields below the plane of the field generator assembly 102. In such cases, the conductive plate or shield 120 significantly attenuates the magnetic field located below the field generator assembly 102 thereby making the system insensitive to objects (e.g., metallic or permeable objects) positioned below the field generator assembly 102. In some implementations, the conductive plate 120 can include a permeable (e.g., ferromagnetic) material to further attenuate the magnetic field located below the field generator assembly 102, e.g., providing additional insensitivity to the system to objects.

In some implementations, the field generator assembly 102 also includes a covering layer 122 that substantially encases the field generators 118. The covering layer 122 provides an interface surface for the patient (e.g., to sit or lie on) during a procedure. The covering layer 122 may be constructed from various types of material or material combinations, for example, a non-conductive or non-magnetic material such as plastic may be incorporated into the covering layer 122. In some implementations, the covering layer 122 can be configured to provide mechanical support to the field generators 118. For example, the field generators 118 can be embedded within a solid covering layer 122. In some implementations, the layer 122 can simply cover the field generators 118. In some implementations, where the field generators 118 are movable, the covering layer 122 can be constructed to accommodate the possible motions (e.g. translational, rotational, etc.) or module combinations of the field generators. For example, the channels or paths for the movable field generators can be defined in the covering layer 122.

The sensor assembly 106 is used to detect the magnetic fields induced in the region 104. In some implementations, the sensor assembly 106 may include one or multiple sensors (e.g., a sensor array) that incorporate one or more types of sensing technology. For example, the sensor assembly 106 may include a simple coil, several coils, one or more Hall sensors, a flux gate sensor or other types of sensors capable for measuring characteristics of an electromagnetic field (e.g., magnetic field flux, magnetic field differential etc.). In some implementations, magnetic fields generated by one or more field generators 118 induce electromotive forces (EMF's) in the sensor assembly 106. The measured EMF's represent the measured local values of magnetic fields at the location and orientation of the sensor assembly 106 in a three dimensional space that defines the region 104. In some implementations, the sensor assembly 106 includes multiple sensors, such as two distinct sensor coils, thereby potentially doubling the number of individual field measurements achievable by the sensor assembly 106. In some implementations, the sensor assembly 106 may include additional components (e.g., circuitry, electronics devices, etc.) for communicating the measured signals to a computing device 110. For example, the sensor assembly 106 may include a transceiver configured to communicate with the computing device 110 (for example, by way of the communications link 112 which can include simple wired or wireless connections or may utilize a wired or wireless network).

The sensor assembly 106 outputs signals that represent several measured magnetic fields corresponding to the individual fields induced by activating one or multiple field generators 118 (e.g., different sets of generators such as generator pairs). Measuring several fields induced within the region 104 allows tracking of the sensor assembly 106 with multiple degrees of freedom. For example, at least five different magnetic fields may be used to determine five degrees of freedom (x, y, z, $\varphi$, $\theta$), where the coordinates (x, y, z) and angles ($\varphi$, $\theta$) specify the three-dimensional location and orientation, respectively, of the sensor with respect to a reference. In some implementations, higher number of fields can improve the accuracy in calculating the location of the sensor assembly 106. For example, the field generator assembly 102 can be configured such that eight or twelve different field generators 118 are used for inducing the distinct magnetic fields. In this configuration, the sensor assembly 106 would measure the respective fields generated by each of the eight or twelve field generators 118, resulting in eight distinct field measurements.

In some implementations, where the sensor assembly 106 includes two sensor coils, each coil could independently measure the strength of the magnetic field generated by a single set of field generators. Therefore, if eight distinct field measurements are desired and the sensor assembly 106 includes two sensor coils, only four sets of field generators 118 would be needed, as each coil would independently measure the field generated by each of the four sets of field generators 118, thus resulting in eight distinct field measurements. In other implementations, where the sensor assembly 106 includes two or more sensor coils, the coils could be treated as a set. Such a set would allow the sensor coils to be positioned and oriented to optimize the measurement of the magnetic field.

In some implementations, the measured magnetic field values depend on one or more system related parameters (e.g., a gain factor of the sensor assembly 106) and the three-dimensional location and the orientation of the sensor coil. The number of field generators 118 and the number of sensor coils in the sensor assembly 106 may vary depending upon number of factors including the particular measurement application (e.g., measurements in a surgical theater). In this particular arrangement, the computing device 110 determines the gain factor of the sensor assembly 106 along with the position and orientation of the sensor assembly 106. Since the position and orientation of the sensor assembly 106 is described by specifying multiple degrees of freedom (e.g. up to six degrees that include x-axis position, y-axis position, z-axis position, roll, pitch, and yaw), a matching number of position factors (e.g., six) may be calculated by the computing device 110. As such, the computing device 110 produces a combined number of factors (e.g., seven) for representing the position and gain. In some implementations, the number of distinct field measurements desired to determine these factors is one greater than the number of factors being determined. Accordingly, if the computing device 110 determines the system gain factor and six positional factors (i.e., degrees of freedom), i.e., a total of seven calculated factors, a total of eight distinct field measurements may be needed. As stated above, this can be achieved utilizing a single sensor coil in the sensor assembly 106 and eight field generators 118. Alternatively, a sensor assembly with two sensor coils and four field generators 118, or other similar variations, may be utilized. Similarly, if the computing device 110 determines the system gain factor plus five positional factors (i.e., five degrees of freedom), a total of six calculated factors need to be determined. Again, as described above, this can be accomplished utilizing a variety of configurations of the field generator sets and sensor coils.

When different field generators 118 are excited during separate time instances, the computing device 110 may need to know details about the field generators inducing the detected magnetic fields. In one arrangement, the computing device 110 can identify the field generators 118 inducing the magnetic field detected by the sensor assembly 106 based on information communicated to the computing device 110 from the field generator assembly 102. In other implementations, the timing of the field generators and the sensor assembly is derived from a synchronization signal derived from one of: the computing device, the field generator assembly, or the sensor assembly. In some implementations timing information related to the induced fields is used to identify the field generators 118 producing a measured field. For example, field generator assembly 102 may temporally multiplex power to the different field generators 118 and provide the timing information for determining the location of the sensor assembly 106 (e.g., the information is provided to the computing device 110 via the sensor assembly 106 and the communications link 112).

In some implementations, the field generators 118 can be distributed in the field generator assembly, such that at least two of the field generators 118 are offset in position, e.g., with respect to the remaining field generators 118. The field generators 118 can be distributed in any pattern to achieve the desired magnetic field shape, e.g., further described in reference to FIG. 5 below. Furthermore, one or more of the field generators 118 can have an angular orientation, e.g., oriented at an angle in elevation, azimuth, or some combination therein, relative to the field generator assembly 102. In some implementations, the computing device 110 can determine the angular orientations of the field generators 118 based on measurements of the corresponding magnetic fields generated by the field generators 118.

In some arrangements, the field generating assembly 102 may drive each field generators 118 at different frequencies. To identify the particular field generator responsible for a measured field, the computing device 110 may decompose measured EMF's from the sensor assembly 106 into frequency components. These frequency components of the measured fields are then matched to individual field generator.

The sensor assembly 106 sends the measured field values to the computing device 110 that uses the measured magnetic field values to determine the location/orientation of the sensor assembly 106. In some implementations, such determinations are executed by comparing the measured magnetic field values to magnetic field values from a physical model.

The physical model can be a set of physical equations that determine values of magnetic fluxes measured by the sensor assembly 106 as a function of several parameters. As such, the physical model may describe the values of magnetic fluxes that can be expected at different points within a measurement volume (such as the region 104) due to magnetic fields induced by known sources at known locations (such as field generators). The parameters can therefore be calculated from an actual measurement by comparing with the physical model. The parameters may include but are not limited to: the position, orientation, and magnetic moments of the field generators 118; and the location, orientation, and sensitivity of the sensor assembly 106. A vector (x, y, z) and a pair of angles (φ, θ) may specify the three-dimensional location and orientation of the sensor coil(s) in the sensor assembly 106. If the sensor assembly 106 has multiple coils, the parameters may include an additional angular parameter (Ψ) that defines relative orientations of coils in the sensor assembly 106. Such a parameter (e.g., a sixth degree of freedom) may be calculated by utilizing a sensor assembly 106 having a second coil on a different axis (as multiple coils operating on equivalent axes may not allow sensing probe rotation about that axis). The physical model may describe each field generators 118 as a magnetic multi-pole such that the fields measured by the sensor assembly 106 are the associated multi-pole fields (e.g., dipole or quadrupole). The multi-pole field values can depend on the system gain and the location, orientation, and magnetic moment "m" of each individual field generator 118. The measured values of the magnetic flux may depend on the location, size, orientation and gain of the sensor assembly with respect to the field generators 118.

In some implementations, the physical model can also be based on one or more underlying assumptions regarding the environment near the region 104. For example, a model may assume pre-selected values for the location and orientation of each field generators 118 and the absence of other sources or field distorting objects. The presence of field distorting objects (e.g., conductors, other field sources) may require additional parameters in order for the model to correctly predict field values. In some implementations, the sensor assembly 106 may measure time varying magnetic fields. Alternatively, if static field measurements are desired, a flux gate sensor, hall effect sensor or similar type of sensor can be utilized in the sensor assembly 106 to provide the measurement of static (or constant) magnetic fields. In some implementations, once measured by the senor assembly 106, the magnetic field values are provided to the computing device 110 that calculates the appropriate system gain factor and location/orientation of the sensor assembly 106. In some implementations, the sensor assembly 106 measures a set of magnetic fluxes to obtain a set of measured magnetic field values B1-Bn, in which "n" is greater than or equal the number of factors (i.e., position and system gain) being calculated.

In some arrangements, the measured field values B1-Bn may have a non-linear dependence on the three-dimensional location/orientation of the sensor assembly 106 and a linear dependence on the system gain factor. The location and orientation of the sensor assembly 106 may be defined by a vector (x, y, z) and at least a pair of azimuthal and polar angles (θ, φ), respectively. The vector (x, y, z) can be specified with respect to a coordinate system 114 with a known origin. While FIG. 1 illustrates a Cartesian coordinate system 114, other types of coordinate systems, such as a polar coordinate system, may be used. Further, the system gain factor of the sensor assembly 106 can be defined by a gain coefficient (g). By using a physical model for the "measured" field dependencies, the computing device 110 can determine the gain factor, location, and orientation of the sensor assembly 106 from the associated measured field values B1-Bn. In some implementations, the gain factor, location and orientation may be calculated by the computing device 110 via an iterative process. Such an iterative process is described in U.S. application Ser. No. 09/892,153 (issued as U.S. Pat. No. 6,625,563), filed Jun. 26, 2001, which is incorporated here by reference in its entirety.

The physical model may describe a pre-selected magnetic environment in the region of the sensor assembly 106 (e.g., the region 104). The pre-selected magnetic environment may or may not include contributions from nearby objects. For example, the actual environment may be different due to the presence of field distorting objects that support Eddy currents (e.g., a pair of surgical scissors, ferromagnetic materials, and active sources of magnetic fields). If the pre-selected environment is different from the actual environment, the model may require incorporation of additional parameters in order to predict correct magnetic field values. In some implementations, the computing device 110 can be configured to detect and alert users about the presence of potentially measurement distorting conditions (e.g., by flashing messages on a video monitor or through audio alert signals). In some instances, the effects of field distorting objects that support Eddy currents can be reduced by treating these Eddy current sources as additional generators. While the object 108 is shown to be a scalpel in FIG. 1, this is only for illustrative purposes. The object 108 can be other devices or tools, e.g., a catheter, an endoscope, biopsy needles, body-mounted position sensors, etc.

The computing device 110 can be any computer, such as a laptop or desktop computer, configured to perform the functions described herein. In some implementations, the computing device 110 is a mobile computing unit such as a smart phone, a personal digital assistant, or a handheld computing unit. In some implementations, the computing device is a specialized computing device designed specific for the purposes of controlling the magnetic field generation, and calculating the position and orientation of the sensor coil from the measured signals. The computing device 110 is configured to run computer program products tangibly embodied in an information carrier, e.g., in a machine-readable storage device, for execution by a programmable processor; and features can be performed by a programmable processor executing a program of instructions to perform functions of the described implementations by operating on input data and generating output. In some implementations, the sensor assembly 106 and the computing device 110 are configured to communicate with each other via communication links such as universal serial bus (USB), Bluetooth, wireless USB etc. The described features can be implemented in one or more computer programs that are executable on a programmable system including at least one programmable processor coupled to receive data and instructions from, and to transmit data and instructions to, a data storage system, at least one input device, and at least one output device. A computer program includes a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors. Generally, a processor will receive instructions and data from a read-only memory or a random access memory or both. The computing device 110 can include a processor for executing instructions and one or more memories for storing instructions and data.

The computing device 110 may communicate with the sensor assembly 106 over the communications link 112. In some implementations, the communications link 112 may include direct wired or wireless connections between the sensor assembly 106 and the computing device 110. Such connections can include USB, Bluetooth, wireless USB, etc. In other cases, the communications link 112 may include a wired or wireless network such as a local area network (LAN), a metropolitan area network (MAN), or a wide area network (WAN) such as the Internet.

While the system described above makes use of a sensor array to track the tool and the field generator assembly to generate the magnetic fields, it should also be apparent that the inverse of this configuration is equally feasible, i.e., all magnetic sensors could be replaced by generators and all generators replaced by sensors.

Figure 2:
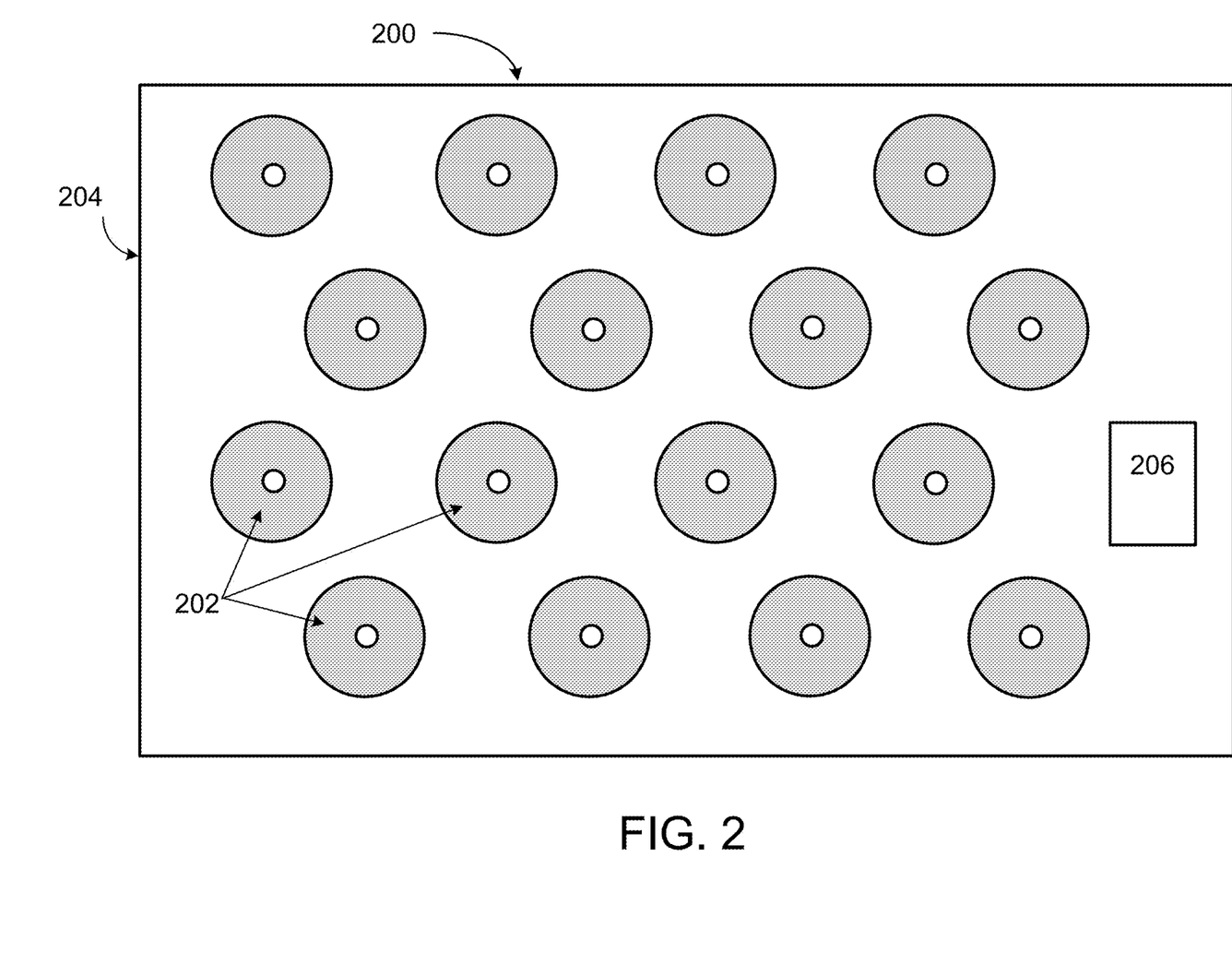
FIG. 2 is a schematic top view of an example of a field generator assembly.

Referring to FIG. 2, a schematic diagram depicts a top view of an example field generator assembly 200 that includes a plurality of individual field generators 202 (similar to the field generators 118 shown in FIG. 1) distributed on a layer 204. Even though FIG. 2 shows sixteen field generators 202 distributed in a particular manner, this is only for illustrative purposes and should not be considered limiting. More or fewer field generators 202 may be placed in the field generator assembly 200 in various other distributions, including distributions in multiple planes (e.g., vertically distributed planes). The layer 204 can be made of substantially the same material as the covering layer 122 described above with respect to FIG. 1. In some implementations, the layer 204 can be the top surface of a conductive plate or shield (e.g., conductive plate 120 shown in FIG. 1). One or more field generators 202 are connected with each other and to a main power supply by wires (not shown). The connections can be configured in accordance with which generators are scheduled to be simultaneously activated. The field generator assembly 200 may also include a circuit board 206. In some implementations, the circuit board houses an electronic module that controls the excitation or firing of the field generators 202. The circuit board 206 may also include a memory which, in communication with the computing device 106, stores configuration data associated with the field generator assembly 200. The circuit board 206 may also serve as an interface with a power supply powering the field generator assembly 200. In some implementations, the computing device 106 can be implemented as a part of the circuit board 206.

Different magnetic fields can be produced by orienting magnetic field generators at different angular orientations. Some resulting magnetic fields can be advantageous for tracking an object within a given region. For example, parallel magnetic fields close to the field generator assembly can cause difficulties for determining the position and the orientation of a sensor. Generally, the natural placement of coils in field generators is to have them as flat as possible, e.g., all lying in the same plane. Close to the field generator, however, this results in all magnetic fields being generated in the same direction. When magnetic fields are oriented in the same direction, at close ranges fewer field generators contribute useful information about the position and the orientation of the sensor. Magnetic fields that are not oriented in the same direction are advantageous because the sensor can determine unique measurements based on each magnetic field, even at close distances. Even at close distances, the magnetic fields provide the different information to the sensor.

Figure 3:
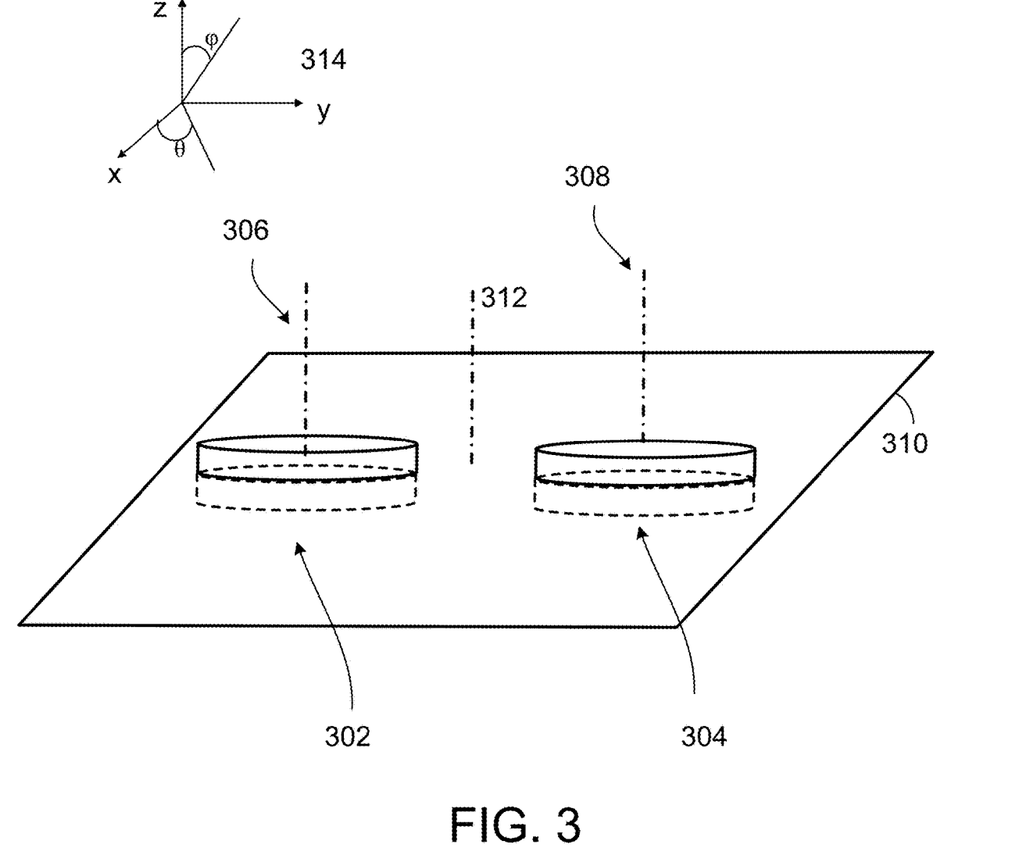
FIG. 3 is a diagram of two field generators with the same angular orientation.

FIG. 3 illustrates a view of a portion of generator assembly 300 that includes two magnetic field generators 302, 304 which have the same angular orientation. Magnetic field generator 302 is shown with a longitudinal axis 306 (e.g., that extends through the center of the generator) which illustrates the angular orientation of the magnetic field generator 302. Magnetic field generator 304 is shown with a longitudinal axis 308 (e.g., that extends through the center of this generator) which illustrates the angular orientation of the magnetic field generator 304. Both magnetic field generators 302, 304 are aligned in a plane 310. For example, the plane 310 can represent a section of a table, a wall, etc. In the illustrated example, longitudinal axis 306 is perpendicular to the plane 310. Longitudinal axis 308 is also perpendicular to the plane 310. The plane 310 is also illustrated with an axis 312 to illustrate the angular orientation of the plane 310. The bottoms of each generator 302, 304 is below the plane 310, so the bottom half of each magnetic field generator 302, 304 is illustrated in broken lines. The axis 312 is perpendicular to the plane 310. Because each longitudinal axis 306, 308 has the same angular orientation as the axis 312 of the plane 310 (e.g., relative to a coordinate system 314), both magnetic field generators have the same angular orientation as the plane 310 and each other. The resulting magnetic fields have the same orientation because the magnetic field generators 302, 304 have the same angular orientation. As stated above, when magnetic fields are oriented in the same direction, at close ranges fewer field generators contribute useful information about the position and the orientation of the sensor.

Figure 4:
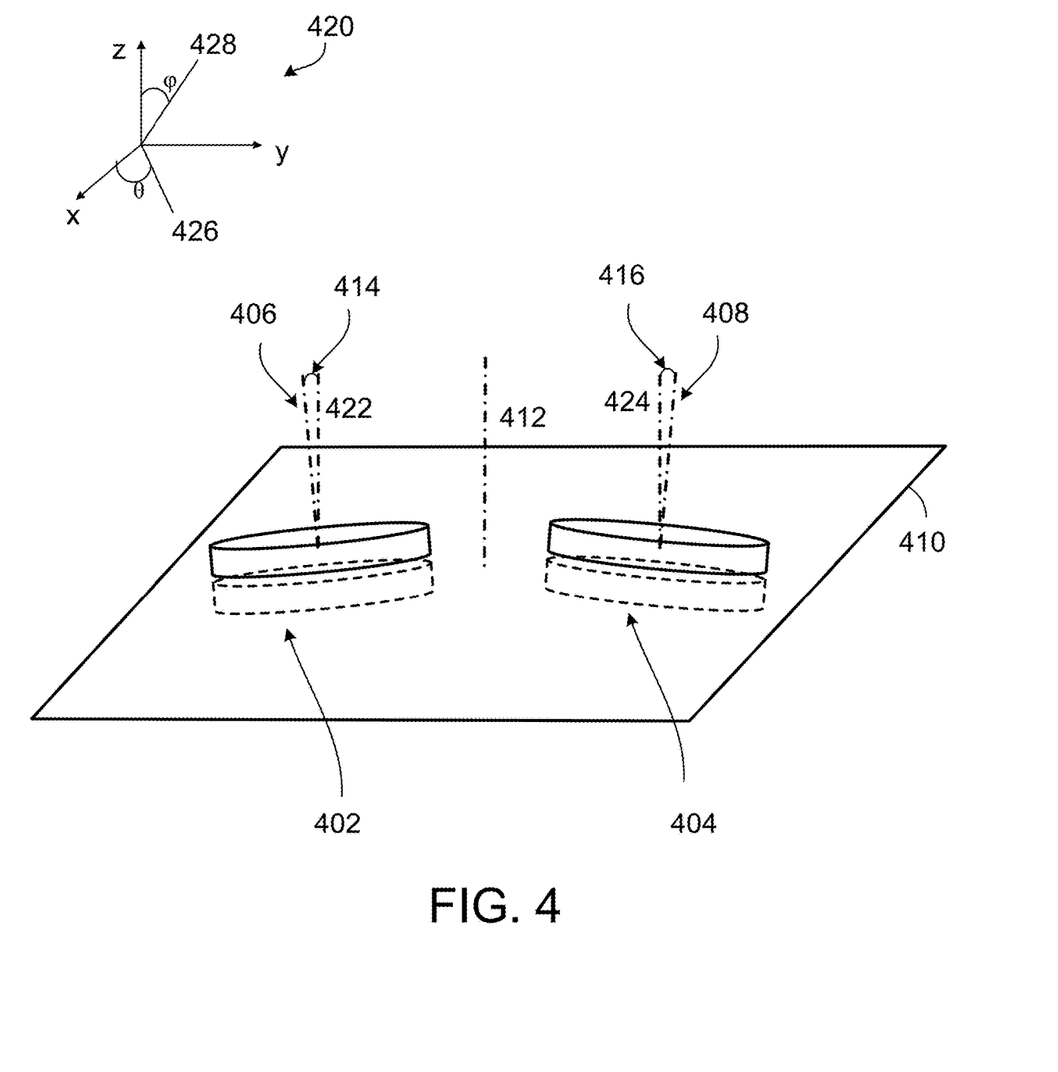
FIG. 4 is a diagram of two field generators with different angular orientations.

Magnetic fields that are not oriented in the same direction are advantageous because the sensor can determine unique measurements based on each magnetic field, even at close distances. For example, even at close distances, the magnetic fields provide the different information to the sensor. FIG. 4 illustrates a view of a portion of a generator assembly 400 that includes two magnetic field generators 402, 404 which have different angular orientations. Magnetic field generator 402 is shown with a longitudinal axis 406 (e.g., that extends through the center of the generator) which illustrates the angular orientation of the magnetic field generator 402. Magnetic field generator 404 is shown with a longitudinal axis 408 (e.g., that extends through the center of this generator) which illustrates the angular orientation of the magnetic field generator 404. Both magnetic field generators 402, 404 are aligned in a plane 410. For example, the plane 410 can represent a section of a table, a wall, etc. In the illustration, the plane 410 extends through the centers of the magnetic field generators 402, 404. The bottom half of each magnetic field generator 402, 404 is positioned beneath the plane 410 and is illustrated with broken lines.

In the illustrated example, each longitudinal axis 406, 408 has a different angular orientation relative to the plane 410. To illustrate how the magnetic field generators 402, 404 have a different angular orientation relative to the plane 410, the plane 410 is also illustrated with an axis 412 to illustrate the angular orientation of the plane 410. The axis 412 is perpendicular to the plane 410. Another axis 422 is perpendicular to the plane 410 and extends through the center of the magnetic field generator 402. The longitudinal axis 406 of generator 402 is tilted by an angle 414 from the axis 422. Magnetic fields that are not oriented in the same direction (i.e., tilted) are advantageous because the sensor can determine unique measurements based on each magnetic field, even at close distances.

Angular orientations and tilts can be represented in a variety of ways. For example, angular orientations can be represented in a Cartesian coordinate system. A coordinate system 420 includes an x axis, a y axis, and a z axis. A line 426 illustrates an azimuth angle (i.e., θ) in the coordinate system 420. The azimuth angle of the line 426 illustrates rotation from the x axis to the y axis (i.e., around the z axis). Another line 428 illustrates an elevation angle (i.e., φ) in the coordinate system 420. The line 428 illustrates deviation from the z axis. Any point in the coordinate system 420 can therefore be defined with an azimuth angle and an elevation angle. Angular orientations can similarly be defined with an azimuth angle and an elevation angle. The angle 414 separating the longitudinal axis 406 from the axis 422 can be defined by an azimuth angle and an elevation angle. The longitudinal axis 408 also has a different angular orientation than the plane 410. Axis 424 is perpendicular to the plane 410 and extends through the center of the magnetic field generator 404. The longitudinal axis 408 of generator 404 is tilted by an angle 416 from the axis 424. The angle 414 separating the longitudinal axis 406 from the axis 422 can be defined by an azimuth angle and an elevation angle (e.g., relative to coordinate system 420).

Also, magnetic field generator 402 is at a different angular orientation than magnetic field generator 404. The longitudinal axis 406 of the magnetic field generator 402 is tilted to the left of the axis 422. For example, the longitudinal axis 406 has an azimuth angle which corresponds to the left of the axis 422. Meanwhile, the longitudinal axis 408 of the magnetic field generator 404 is tilted to the right of the axis 424. The longitudinal axis 408 has an azimuth angle which corresponds to the right of the axis 424. The different azimuth angles cause the magnetic field generators 402, 404 to be tilted in different directions. The resulting magnetic fields are non-parallel because the magnetic field generators 402, 404 have different angular orientations.

The magnetic field generators 402, 404 are at angular orientations that are in opposite directions from each other. For example, the magnetic field generators 402, 404 have azimuth angles which cause the magnetic field generators to be pointed away from each other. However, in some implementations, the magnetic field generators 402, 404 are in angular orientations pointed towards each other. For example, the magnetic field generator 402 can have an azimuth angle which corresponds to the right of the axis 422. Meanwhile, the magnetic field generator 404 can have an azimuth angle which corresponds to the left of the axis 424. These exemplary azimuth angles would cause the magnetic field generators to be pointed towards each other. In other implementations, the magnetic field generators are tilted in directions that are not towards each other or away from each other (e.g., the magnetic field generators can have a variety of azimuth angles). The magnetic field generators can be set at any angular orientation in any direction. Additionally, the magnetic field generators can have a range of elevation angles. In some implementations, the magnetic field generators can have different elevation angles and different azimuth angles. In other implementations, the magnetic field generators can have the same azimuth angle but different elevation angles.

In the illustrated example, the angle 414 can be a relatively small angle (e.g., one degree to 15 degrees). In some implementations, a small elevation angle can be advantageous because the magnetic field generator is more consistent with the surface of the plane. For example, a large angle 414 will result in the magnetic field generator varying further from the plane 410. Magnetic field generators that are more consistent with the surface of the plane are advantageous for thin magnetic assemblies. Magnetic field generators with large angles 414 vary further from the plane, which increases the thickness of a magnetic assembly. In some implementations, the angle 414 can be a larger angle (e.g., larger than 15 degrees).

Figure 5:
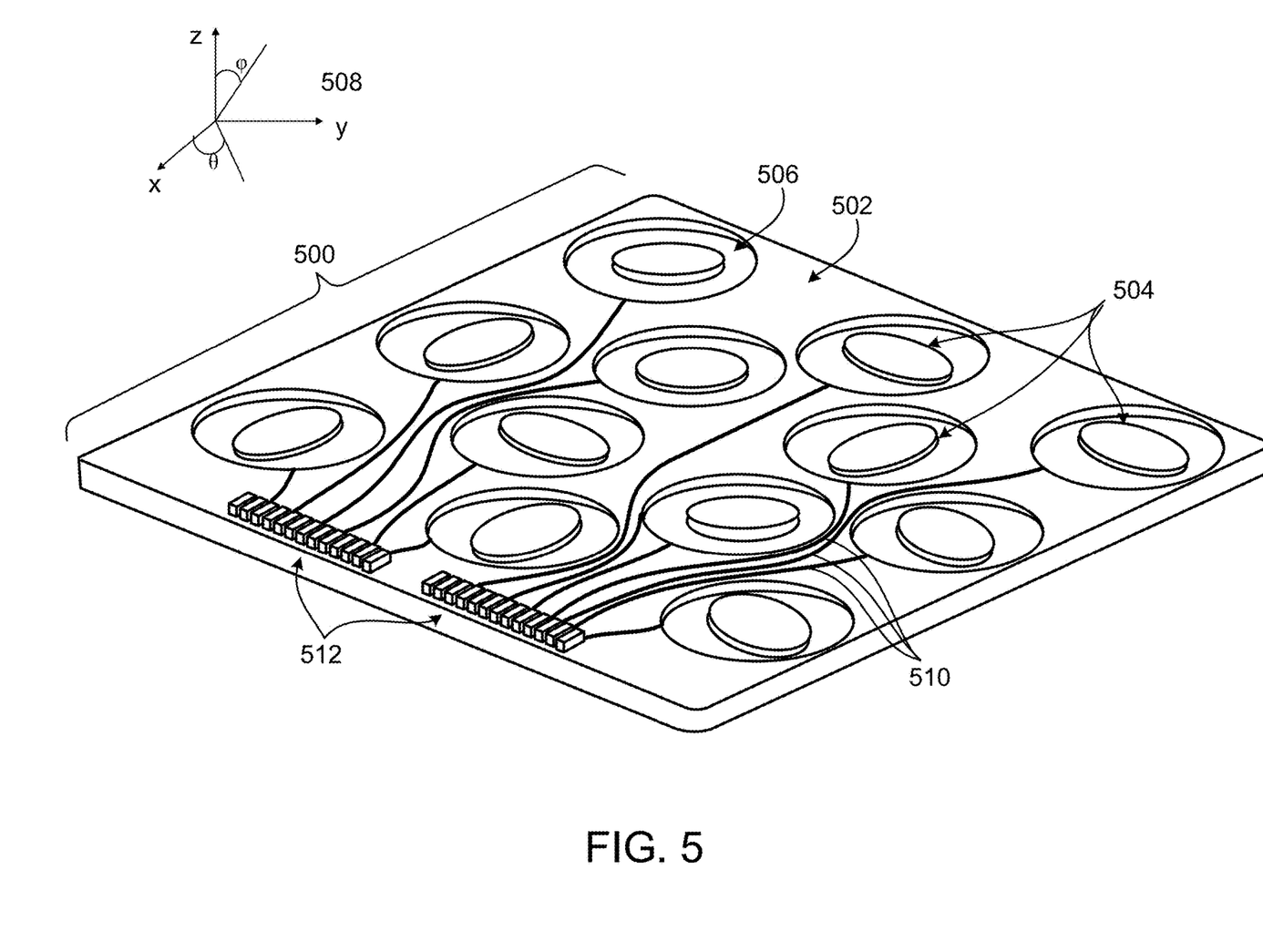
FIG. 5 is a diagram of an example of a field generator assembly.

FIG. 5 illustrates a field generator assembly 500. The field generator assembly 500 can be used in a magnetic tracking system (e.g., similar to magnetic tracking system 100 of FIG. 1). The field generator assembly 500 includes a housing 502 with a shape to accommodate field generators 504 (e.g., such as the field generators of FIG. 4). The housing 502 is generally flat so the generators lay in a plane. Various types of materials can be employed to produce the housing 502; for example non-metallic materials (e.g., plastics), metallic materials (e.g., steel), combinations for materials, etc., can be utilized. Different geometries, shapes, dimensions, etc., can also be utilized.

Additionally, each generator is positioned in an individual well (e.g., recess) 506. In other embodiments, different geometries can be used for each well (e.g., triangular, hexagonal, octagonal, etc.). In the illustrated embodiment, all the individual wells have the same geometry. However, in other embodiments, different wells can have different geometries. Additionally, in the illustrated embodiment, each generator is in an individual well 506. However, in other embodiments, multiple generators may be positioned in one well. In some embodiments, the wells can be positioned in particular patterns (e.g., an array, concentric circles, etc.). In other embodiments, the wells may not be positioned in a pattern. Parameters such as the geometries, number of wells, and the number of generators in each well along with the relative distance and orientation of the wells can be adjusted to produce a field with a desired shape.

Each field generator 504 is at an angular orientation that is slightly different relative to the housing and relative to each other (e.g., offset by a small angle relative to the housing 502 and relative to each other). For example, each field generator 504 can include a different azimuth angle and a different elevation angle. For example, a first field generator can have a first angular orientation relative to the coordinate system 508, a second field generator can have a second angular orientation relative to the coordinate system 508, a third field generator can have a third angular orientation relative to the coordinate system 508, etc. In some implementations, each field generator 504 can have an angular orientation pointed towards the center of the assembly 500 (e.g., each field generator 504 can have an azimuth angle to tilt the field generator towards the center of the assembly). In other implementations, each field generator 504 can have an angular orientation pointed away from the center of the assembly 500 (e.g., each field generator 504 can have an azimuth angle to tilt the field generator away from the center of the assembly). In some implementations, some field generators can have an angular orientation to point towards the center of the assembly 500, and other field generators can have an angular orientation to point away from the center of the assembly. For example, field generators that are in close proximity to the center of the assembly 500 can point towards the center of the assembly 500, and field generators that are closer to an edge of the assembly 500 can have an angular orientation to point away from the center of the assembly (i.e., towards the edge of the assembly). In some implementations, a portion (e.g., one generator, two generators, three generators, etc.) of the field generators 504 have different angular orientations, and other field generators 504 have the same angular orientation. In other implementations, every field generator 504 has a different angular orientation. The field generators 504 have different angular orientations to produce magnetic fields in different directions. Each field generator 504 has a connecting wire 510 which leads to an external connector 512. The external connector 512 can connect the field generator 504 to a power source, for example.

Figure 6:
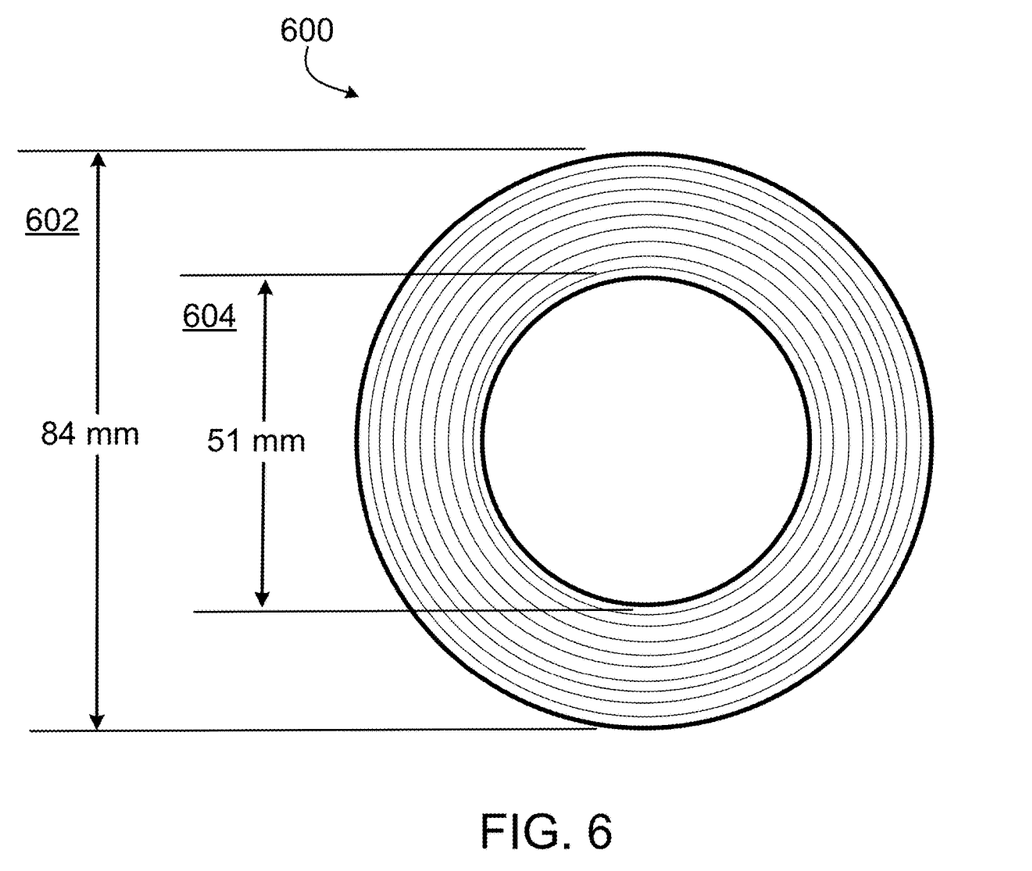
FIG. 6 is a perspective view of an example of a magnetic field generator.

Referring to FIG. 6, a top view of an example of an individual field generator 600 is shown. The field generator 600 can be designed a flat coil with an orifice at a center of the coil 600. A thin generator 600 can be used to realize a flat field generator assembly 200 as shown in FIG. 2. Flat field generators can be very thin. For example, the field generator 600 includes a coil, and the thickness of the flat coil can be, for example, about 2 mm to about 3 mm. The outer diameter 602 of the coil 600 can be, for example, about 84 mm. The inner diameter 604 of the coil 600 can be, for example about 51 mm. In some implementations, a field generator can be other shapes. For example, the field generator can be a quadratic field generator (e.g., the field generator is shaped like a parabola). In another example, a field generator is a planar spiral (e.g., the field generator is a spiraled coil without plates).

Figure 7:
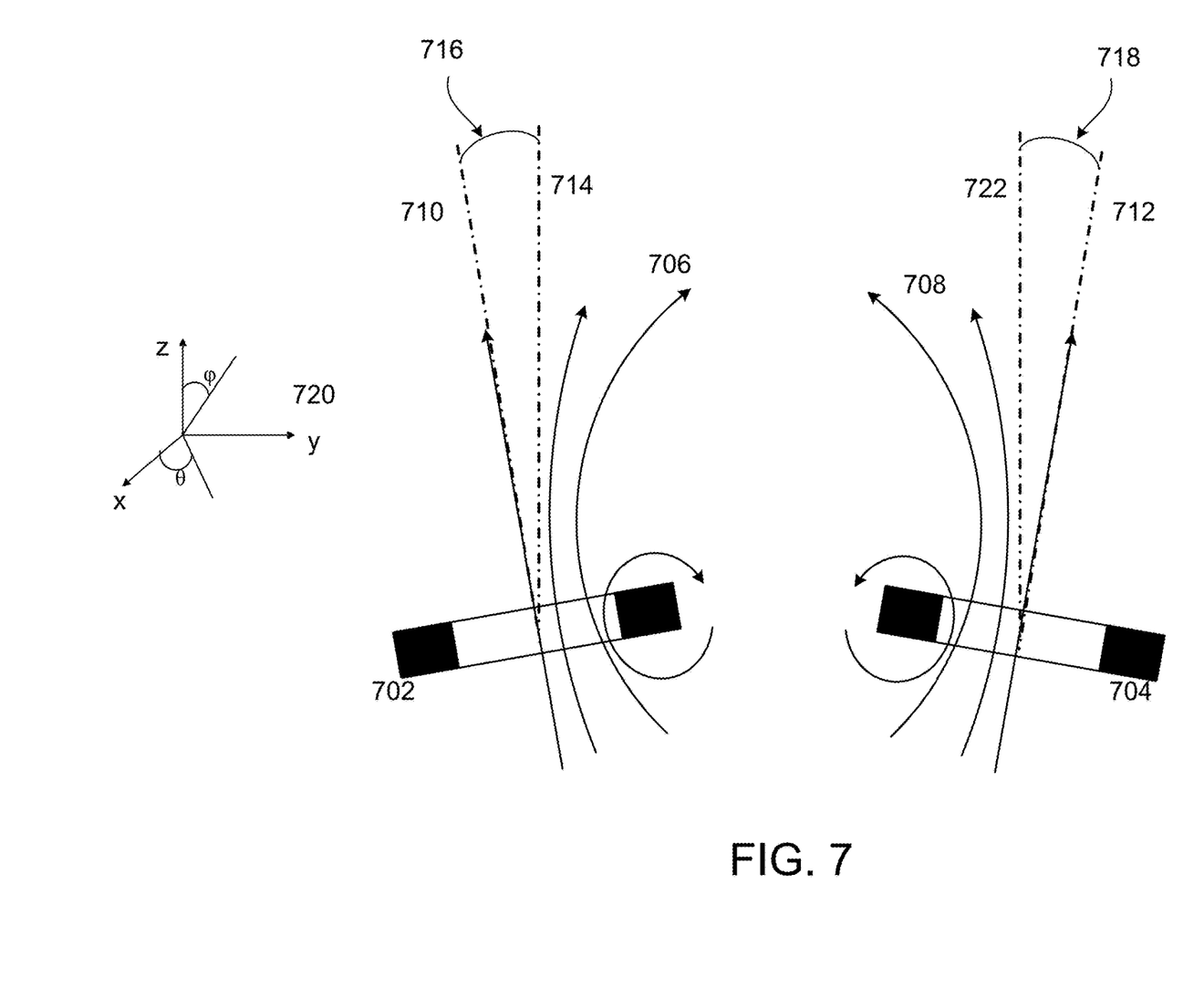
FIG. 7 is a schematic diagram showing an example of magnetic fields produced by magnetic field generators.

Referring to FIG. 7, an example of fields induced by a pair of generators 702, 704 are shown. In this particular example, current applied to each of the generators 702, 704 flows in the same direction and produces lines of magnetic flux (graphically illustrated with respective lines 706, 708). The generators 702, 704 also have different angular orientations relative to each other. Magnetic field generator 702 is shown with a longitudinal axis 710 (e.g., that extends through the center of this generator) which illustrates the angular orientation of the magnetic field generator 702. Magnetic field generator 704 is shown with a longitudinal axis 712 (e.g., that extends through the center of this generator) which illustrates the angular orientation of the magnetic field generator 704. Parallel axes 714, 722 illustrate how the magnetic field generators 702, 704 have different angular orientations. The axis 714 is perpendicular to a plane which connects the centers of the magnetic field generators 702, 704. Longitudinal axis 710 is tilted by an angle 716 from the axis 714 (e.g., relative to coordinate system 720). The angle 716 can be defined by an azimuth angle and an elevation angle. The longitudinal axis 710 is tilted to the left of the axis 714. Also, longitudinal axis 712 is tilted by an angle 718 from the axis 722. The longitudinal axis 712 is tilted to the right of the axis 722. Therefore, the axes of the generators 702, 704 are non-parallel and the resultant magnetic field lines 706, 708 are non-parallel. Magnetic fields that are not parallel are advantageous; for example, a sensor would determine a unique measurement from each magnetic field 706, 708, regardless of position. Even at positions very close to the generators 702, 704, the magnetic fields are not parallel because the generators 702, 704 are tilted. This allows the sensor to distinguish each field 706, 708 and each respective generator 702, 704.

Figure 8:
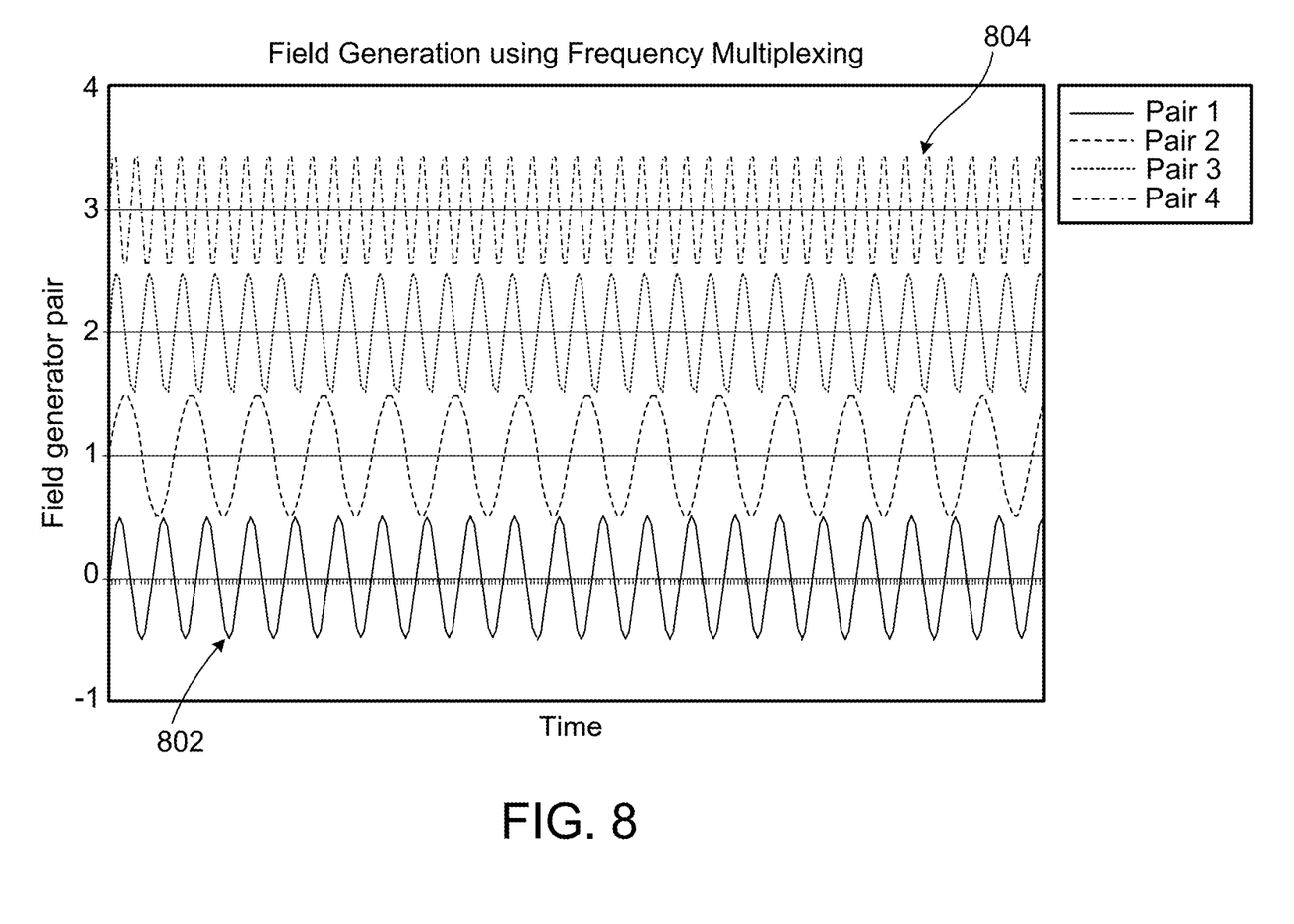
FIG. 8 is an example of a frequency division multiplexed scheme of exciting different magnetic field generators.

In some arrangements, a field generating assembly may drive each field generator at different frequencies. To identify the particular field generator responsible for a measured field, the computing device may decompose measured EMF's from the sensor assembly into frequency components. These frequency components of the measured fields are then matched to individual field generators. An example of such a frequency division multiplexed excitation scheme is shown in FIG. 8. In this example, a given generator (e.g., field generator 1 as represented on the legend) is excited by an alternating current 802 at a first frequency. Another field generator (e.g., pair 4) is also excited at the same time by another alternating current 804 that has a second frequency, which is different from the first frequency. Similarly, the other generators may be excited using alternating currents operating at other frequencies.

What is claimed is:

1. A magnetic tracking system comprising:
   a field generator assembly comprising a plurality of magnetic field generators for generating a plurality of magnetic fields, each magnetic field is generated by a respective magnetic field generator from the plurality of magnetic field generators of the field generator assembly, wherein:
      the field generator assembly defines a planar surface;
         each of the plurality of magnetic field generators is distributed on the planar surface in a non-overlapping position on the planar surface relative to positions of other magnetic field generators in the plurality of magnetic field generators;
         at least one of the plurality of magnetic field generators is oriented at a first angular orientation relative to the planar surface and at least another of the magnetic field generators from the plurality of magnetic field generators is oriented at a second angular orientation relative to the planar surface, the second angular orientation being different from the first angular orientation, and
      the first angular orientation comprises a first azimuth angle and a first elevation angle and the second angular orientation comprises a second azimuth angle and a second elevation angle relative to a longitudinal center axis perpendicular to the planar surface defined by the field generator assembly;
   a magnetic sensor to measure the plurality of magnetic fields; and
   a computing device configured to compute a position and orientation of the magnetic sensor within the magnetic fields being measured by the magnetic sensor.

2. The magnetic tracking system of claim 1, wherein the magnetic field generators comprise at least one of (i) a wound electromagnetic coil, (ii) a quadratic electromagnetic coil, or (iii) a planar spiral.

3. The magnetic tracking system of claim 1, wherein the magnetic field generators are distributed on the field generator assembly such that at least two of the magnetic field generators are offset in position.

4. The magnetic tracking system of claim 1, wherein the computing device is configured to determine the first angular orientation and the second angular orientation.

5. The magnetic tracking system of claim 1, further comprising a conducting plate below the field generator assembly, wherein the conducting plate comprises a permeable material.

6. The magnetic tracking system of claim 1, wherein the magnetic field generators have a same elevation angle and different azimuth angles.

7. The magnetic tracking system of claim 1, further comprising a third magnetic field generator having a third angular orientation, different from the first angular orientation and the second angular orientation.

8. The magnetic tracking system of claim 1, wherein the first angular orientation is in an opposite direction relative to the second angular orientation.

9. The magnetic tracking system of claim 1, wherein the second elevation angle is different from the first elevation angle.

10. The magnetic tracking system of claim 1, wherein the field generator assembly comprises a plurality of wells, wherein each of the plurality of wells is disposed through at least a thickness of the field generator assembly, and wherein each of the plurality of magnetic field generators is positioned on the planar surface in a different corresponding well from the plurality of wells than other magnetic field generators in the plurality of magnetic field generators.

11. The magnetic tracking system of claim 1, wherein the magnetic sensor comprises a plurality of coils, each of the plurality of coils configured to independently measure a strength of at least one magnetic field from the plurality of magnetic fields.

12. The magnetic tracking system of claim 1, wherein the magnetic sensor is configured to measure a number of magnetic fields from the plurality of magnetic fields.

13. The magnetic tracking system of claim 1, wherein the computing device is configured to determine at least one of (i) a system gain factor of the magnetic sensor, or (ii) one or more position factors.

14. The magnetic tracking system of claim 13, wherein each of the one or more position factors correspond to a degree of freedom for the magnetic sensor.

15. The magnetic tracking system of claim 1, wherein the computing device implements a model configured to predict magnetic field values, and wherein the computing device is configured to compute the position and orientation of the magnetic sensor by comparing (i) measured magnetic field values of the magnetic fields measured by the magnetic sensor to (ii) predicted magnetic field values from the model.

16. The magnetic tracking system of claim 1, wherein the field generator assembly comprises a covering configured to substantially encase the plurality of magnetic field generators.

17. The magnetic tracking system of claim 16, wherein the covering comprises one or both of (i) a non-conductive material, or (ii) a conductive material.

18. The magnetic tracking system of claim 1, wherein one of (i) the computing device, (ii) the magnetic sensor, or (iii) the field generator assembly, is configured to generate a synchronization signal comprising one or more time instances for exciting the plurality of magnetic field generators in the field generator assembly.

19. The magnetic tracking system of claim 18, wherein the field generator assembly is configured to multiplex power to two or more different magnetic field generators from the plurality of magnetic field generators for a period of time, and wherein the computing device is configured to determine, using timing information generated based on the synchronization signal, the position and the orientation of the magnetic sensor.

20. The magnetic tracking system of claim 1, wherein the field generator assembly is configured to operate at least two of the plurality of magnetic field generators at two different frequencies.

* * * * *